(12) United States Patent
Takanashi et al.

(10) Patent No.: US 10,100,870 B2
(45) Date of Patent: Oct. 16, 2018

(54) TRANSMISSION

(71) Applicant: HONDA MOTOR CO., LTD., Tokyo (JP)

(72) Inventors: Tomoya Takanashi, Wako (JP); Yosuke Tokoro, Wako (JP); Mitsuru Sayama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 129 days.

(21) Appl. No.: 15/229,120

(22) Filed: Aug. 5, 2016

(65) Prior Publication Data

US 2017/0037895 A1    Feb. 9, 2017

(30) Foreign Application Priority Data

Aug. 6, 2015  (JP) ................. 2015-155965

(51) Int. Cl.

| F16H 45/02 | (2006.01) |
| F16C 3/02 | (2006.01) |
| B23K 20/12 | (2006.01) |
| F16H 57/00 | (2012.01) |
| F16H 41/24 | (2006.01) |
| B23K 101/04 | (2006.01) |
| B23K 103/20 | (2006.01) |

(52) U.S. Cl.
CPC .......... *F16C 3/023* (2013.01); *B23K 20/1265* (2013.01); *F16H 57/0018* (2013.01); *B23K 2201/04* (2013.01); *B23K 2203/20* (2013.01); *F16H 41/24* (2013.01); *Y10T 403/478* (2015.01)

(58) Field of Classification Search
CPC ...... F16C 3/023; F16H 41/24; F16H 57/0018; B23K 20/1265; B23K 2203/20; B23K 2201/04; Y10T 103/478; Y10T 403/478
USPC .......... 464/182; 228/262.41, 262.5; 156/73.5
See application file for complete search history.

(56) References Cited

U.S. PATENT DOCUMENTS

| 3,874,067 | A | * | 4/1975 | Toyooka | .............. | B23K 20/129 |
| | | | | | | 156/73.5 X |
| 7,850,059 | B2 | * | 12/2010 | Kobayashi | ........... | B23K 11/166 |
| | | | | | | 228/262.41 X |
| 8,047,344 | B2 | * | 11/2011 | Degler | ................ | F16F 15/1234 |
| 8,262,491 | B2 | * | 9/2012 | Burgbacher | ............ | F16C 3/023 |
| 2014/0127423 | A1 | * | 5/2014 | Springer | ................ | F16C 3/023 |

FOREIGN PATENT DOCUMENTS

| CN | 101305214 | 11/2008 | |
| CN | 102821906 | 12/2012 | |
| JP | 63-104790 A | * 5/1988 | ............... 228/262.41 |

(Continued)

OTHER PUBLICATIONS

Chinese Office Action for corresponding CN Application No. 201610630129.X, dated Apr. 3, 2018.

*Primary Examiner* — Greg Binda
(74) *Attorney, Agent, or Firm* — Mori & Ward, LLP

(57) ABSTRACT

A transmission includes a first shaft and a second shaft. The first shaft is made of a first metal material. The first shaft has a hollow structure. The second shaft is made of a second metal material different from the first metal material. The second shaft is fitted into the hollow structure of the first shaft at an axial overlap section. The first shaft and the second shaft are coaxially connected at the axial overlap section with friction stir welding.

19 Claims, 10 Drawing Sheets

(56) References Cited

FOREIGN PATENT DOCUMENTS

| | | |
|---|---|---|
| JP | 2002-224857 | 8/2002 |
| JP | 2006-068782 | 3/2006 |
| JP | 2007-296563 | 11/2007 |

\* cited by examiner

PRESENT INVENTION: PRESS FIT JOINING

TRANSMISSION

CROSS-REFERENCE TO RELATED APPLICATIONS

The present application claims priority under 35 U.S.C. § 119 to Japanese Patent Application No. 2015-155965, filed Aug. 6, 2015. The contents of this application are incorporated herein by reference in their entirety.

BACKGROUND OF THE INVENTION

Field of the Invention

The present invention relates to a transmission.

Discussion of the Background

As a method of joining a butt section (joint section) between one member to be joined and the other member to be joined opposite each other in the axial direction, so-called friction welding is known in which frictional heat is generated by rotating one of the members to be joined while both members are pushed against each other to soften the joint section using this frictional heat, and then their newly-formed faces are subjected to solid-phase welding by pushing both members to be joined against each other with the rotation of these members stopped (see Japanese Patent Application Publication No. 2002-224857, for example).

Japanese Patent Application Publication No. 2002-224857 below states the following (see paragraphs [0024] and [0025] in Japanese Patent Application Publication No. 2002-224857, for example). The speed of rotation of one of the members to be joined is increased to a predetermined number of revolutions r1, and then end faces of both members are made to butt and push against each other for a given period of time (friction period) T1 while the friction pressure is increased until the friction pressure at the butt section between both members reaches a predetermined pressure P1 and their joint interface is heated to a temperature required for pressure welding. Then, once the temperature reaches the required temperature, the rotation is stopped to set the number of revolutions to zero, and the end faces of both members are made to butt and push against each other for a given period of time (upsetting period) T2 while the friction pressure is increased until the friction pressure at the butt section between both members reaches a predetermined pressure P2. With this upsetting process, intermetallic compounds, oxides, softened layers, and the like generated on the joint interface during the friction process are discharged from a marginal portion of the joint interface as flash, and newly-formed faces of these members at the joint interface are joined together.

Meanwhile, as another method of joining the above butt section opposite each other in the axial direction, so-called friction stir welding is known in which frictional heat is generated by pushing (press fitting) a columnar body, which is called a shoulder equipped with a pin on its tip central part, against (into) the butt section from the outer side in the radial direction while rotating the shoulder, then the joint part is brought in a state of plastic flow by softening the joint part with this frictional heat and stirring the softened joint part with the pin provided at the tip central part, and then the shoulder is moved over the entire circumference of the joint section to subject both members to solid-phase welding while softening and stirring the part through which it passes (see Japanese Patent Application Publication No. 2006-68782, for example).

In order for the joint section to have sufficient joint strength, a heat treatment such as an artificial aging treatment needs to be applied on the joint section (see paragraphs [0003] and [0006] in Japanese Patent Application Publication No. 2007-296563, for example).

SUMMARY OF THE INVENTION

According to a first aspect of the present invention, a transmission includes a dissimilar metal joined shaft in which at least a first shaft and a second shaft made of dissimilar materials are joined coaxially. The first shaft has a hollow structure and the second shaft is press fitted into the first shaft. The inner circumferential face of the first shaft and an outer circumferential face of the second shaft have an axial overlap section where the first and second shafts overlap each other in an axial direction. The axial overlap section is joined by friction stir welding.

According to a second aspect of the present invention, a transmission includes a first shaft and a second shaft. The first shaft is made of a first metal material. The first shaft has a hollow structure. The second shaft is made of a second metal material different from the first metal material. The second shaft is fitted into the hollow structure of the first shaft at an axial overlap section. The first shaft and the second shaft are coaxially connected at the axial overlap section with friction stir welding.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
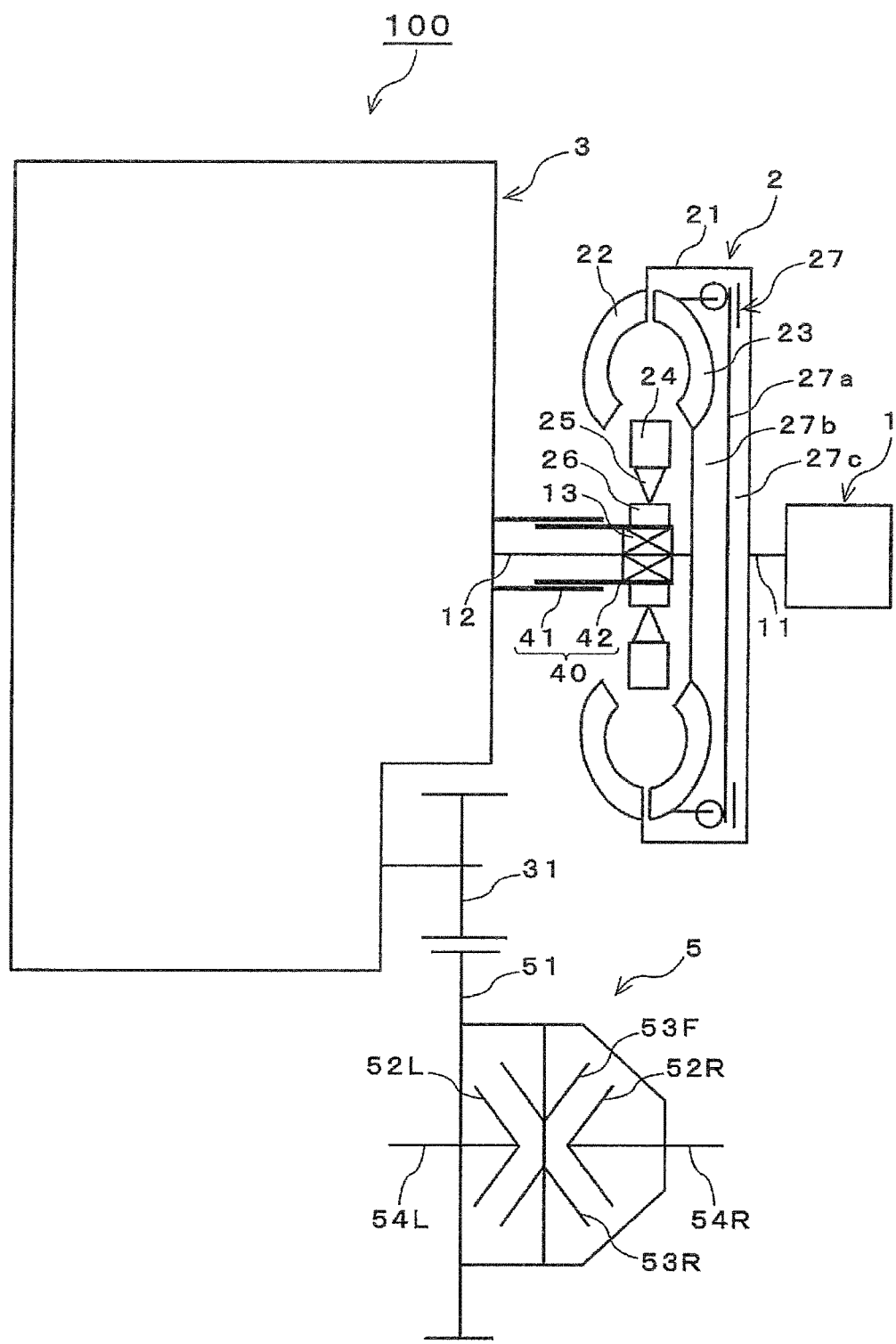
FIG. 1 is a skeleton view illustrating a transmission according to a first embodiment of the present invention.

The embodiments will now be described with reference to the accompanying drawings, wherein like reference numerals designate corresponding or identical elements throughout the various drawings.

Hereinbelow, embodiments of the present invention are described in detail with reference to the attached drawings. FIG. 1 is a skeleton view illustrating a transmission 100 according to an embodiment of the present invention. Note that, an engine (drive source) 1 is also illustrated for the convenience of explanation. As illustrated in FIG. 1, the transmission 100 includes: the engine (drive source) 1; a torque converter 2; a transmission body 3; and a differential mechanism 5.

The driving of the engine 1 is output to a crankshaft 11. The rotation of the crankshaft 11 is input into the transmission body 3 via the torque converter 2. The torque converter 2 is a hydraulic power transmission configured to transmit torque by way of fluid (hydraulic oil), and has: a front cover 21; a pump impeller 22 that is formed integrally with the front cover 21; a turbine runner 23 that is disposed between the front cover 21 and the pump impeller 22 so as to be opposed to the pump impeller 22; and a stator 24 that is supported on a stator shaft 40 with a one-way clutch 25 interposed therebetween. As illustrated in FIG. 1, the crankshaft 1 is connected to the pump impeller 22 of the torque converter 2 via the front cover 21, and the turbine runner 23 is connected to a main shaft 12. In addition, the one-way clutch 25 is mounted on an intermediate member 26, and the intermediate member 26 is spline coupled to a second shaft 42 of the stator shaft 40. The second shaft 42 is provided on its inner circumferential face with a bearing 13 that rotatably supports the main shaft 12. In this respect, the stator shaft 40 according to the present invention will be described in detail later with reference to FIGS. 2 and 3.

A lock-up clutch 27 including a lock-up clutch piston 27a is provided between the turbine runner 23 and the front cover 21. Accordingly, once the lock-up clutch piston 27a comes in contact with the inner face of the front cover 21 and both members 27a and 21 engage with each other, the drive force from the engine 1 is directly transmitted to the main shaft 12. The lock-up clutch piston 27a is operated in such a way that hydraulic oil is fed into and discharged from, or discharged from and fed into, two respective oil chambers formed by partitioning the space inside the torque converter 2 with the lock-up clutch piston 27a, i.e., an oil chamber 27b that is formed closer to the turbine runner 23 than the lock-up clutch piston 27a and an oil chamber 27c that is formed closer to the front cover 21 than the lock-up clutch piston 27a, to thereby generate a pressure difference between both oil chambers. Hydraulic oil is enclosed inside a container formed by the front cover 21 and the pump impeller 22.

In the case of no lock-up control, the rotation of the pump impeller 22 and the turbine runner 23 relative to each other is allowed. In this state, upon transmission of the rotating torque of the crankshaft 11 to the pump impeller 22 via the front cover 21, hydraulic oil with which the container of the torque converter 2 is filled is circulated from the pump impeller 22 to the turbine runner 23 and then to the stator 24 in response to the rotation of the pump impeller 22. Thereby, the rotating torque of the pump impeller 22 is transmitted to the turbine runner 23 and drives the main shaft 12.

On the other hand, during lock-up control, the lock-up clutch 27 is in an engaged state where, instead of causing the front cover 21 to rotate the turbine runner 23 by way of hydraulic oil, the front cover 21 and the turbine runner 23 rotate integrally and the rotating torque of the crankshaft 11 is directly transmitted to the main shaft 12.

As the transmission body 3, it is possible to employ a continuously variable transmission constituted of a pair of pulleys, for example, or an automatic transmission constituted of one or multiple planetary gear mechanisms and clutch mechanisms. The drive force from the engine 1 is changed to a desired number of revolutions by the transmission body 3, and is then output to the differential mechanism 5 to be described later via a final drive gear 31.

The differential mechanism 5 includes: a final driven gear 51 that meshes with the final drive gear 31; left and right side gears 52L and 52R that are configured to transmit the drive force from the engine 1, transmitted from the final driven gear 51, to left and right drive wheels (not illustrated) via left and right drive shafts 54L and 54R, respectively; and front and rear pinion gears 53F and 53R that are configured to absorb a difference in rotation between the left and right drive wheels.

Figure 2:
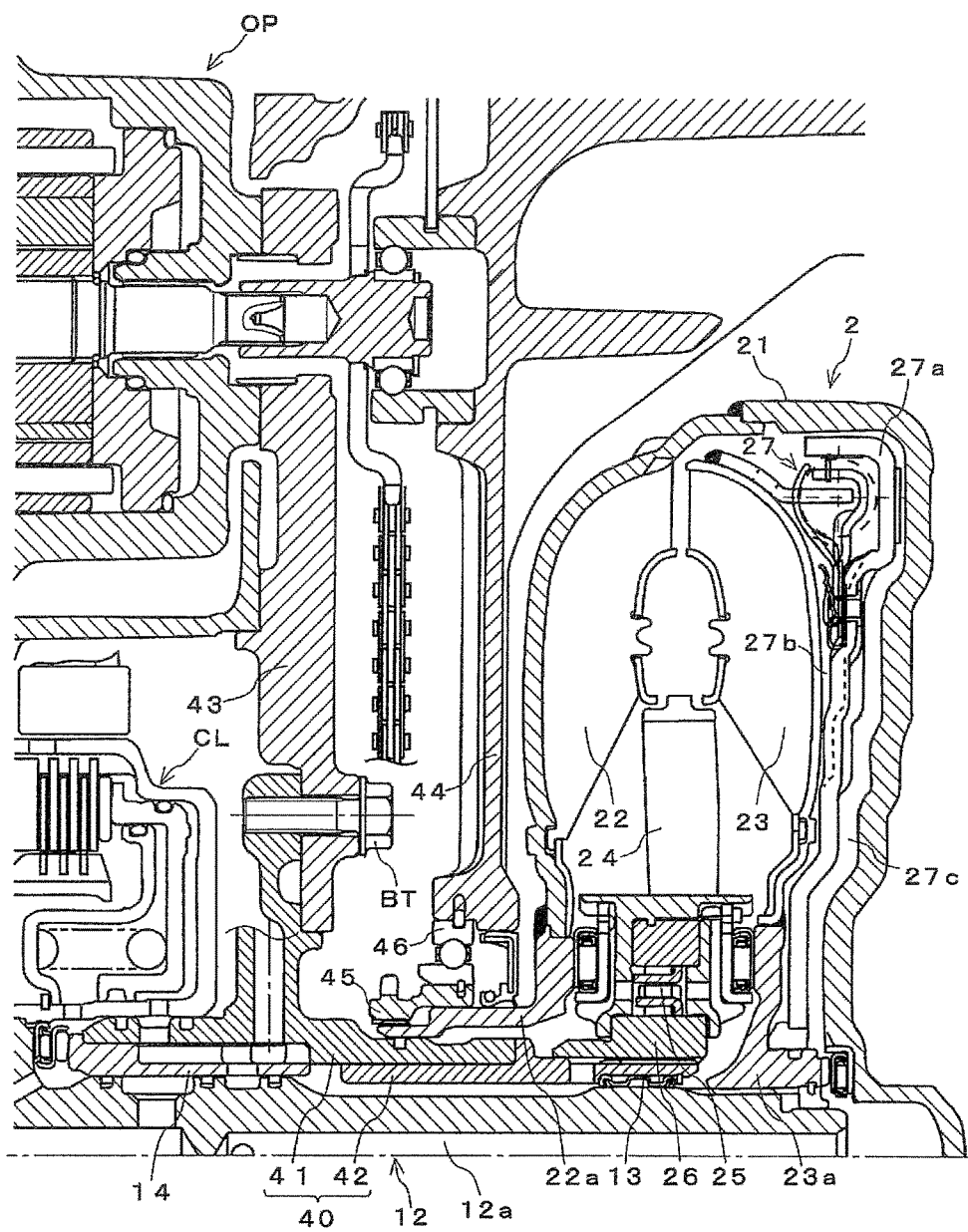
FIG. 2 is a main-part half sectional view illustrating a peripheral part of a stator shaft according to the first embodiment of the present invention.

FIG. 2 is a main-part half sectional view illustrating a peripheral part of the stator shaft 40 according to the embodiment of the present invention. Note that, a part of the hatched region is not illustrated for the convenience of illustration.

An oil path 12a is formed inside the main shaft 12 and, through this oil path 12a, hydraulic oil is fed to hydraulic-operated devices such as the torque converter 2, a clutch CL, and the transmission body 3 (see FIG. 1).

The stator shaft 40 is unrotatably fixed on an outer circumferential face of the main shaft 12. The stator shaft 40 is fixed on a first partition 43 with a bolt BT, and rotatably supports a part of the main shaft 12 via the bearing 13.

In addition, a third shaft 14 is provided between the main shaft 12 and a first shaft 41 of the stator shaft 40, and an oil path is formed inside the third shaft 14. The third shaft 14 is mounted on the outer circumferential face of the main shaft 12.

A boss member 22a is rotatably mounted on an outer circumferential face of the first shaft 41 of the stator shaft 40, the pump impeller 22 is welded to the boss member 22a, and the front cover 21 is welded to the pump impeller 22.

A sprocket 45 for driving an oil pump OP is spline fitted to an outer circumferential face of the boss member 22a, and the sprocket 45 is rotatably supported by a bearing 46 provided on a second partition 44.

The intermediate member 26 on which the one-way clutch 25 is fixed is spline fitted to a tip part of the second shaft 42 of the stator shaft 40. Thus, the stator 24 is mounted on the intermediate member 26, with the one-way clutch 25 interposed therebetween, so as to be rotatable in one direction only.

A turbine runner hub 23a is spline fitted to a tip part of the main shaft 12, and the turbine runner 23 is welded to the turbine runner hub 23a.

In addition, the lock-up clutch piston 27a is mounted on the turbine runner hub 23a.

Figure 3A:
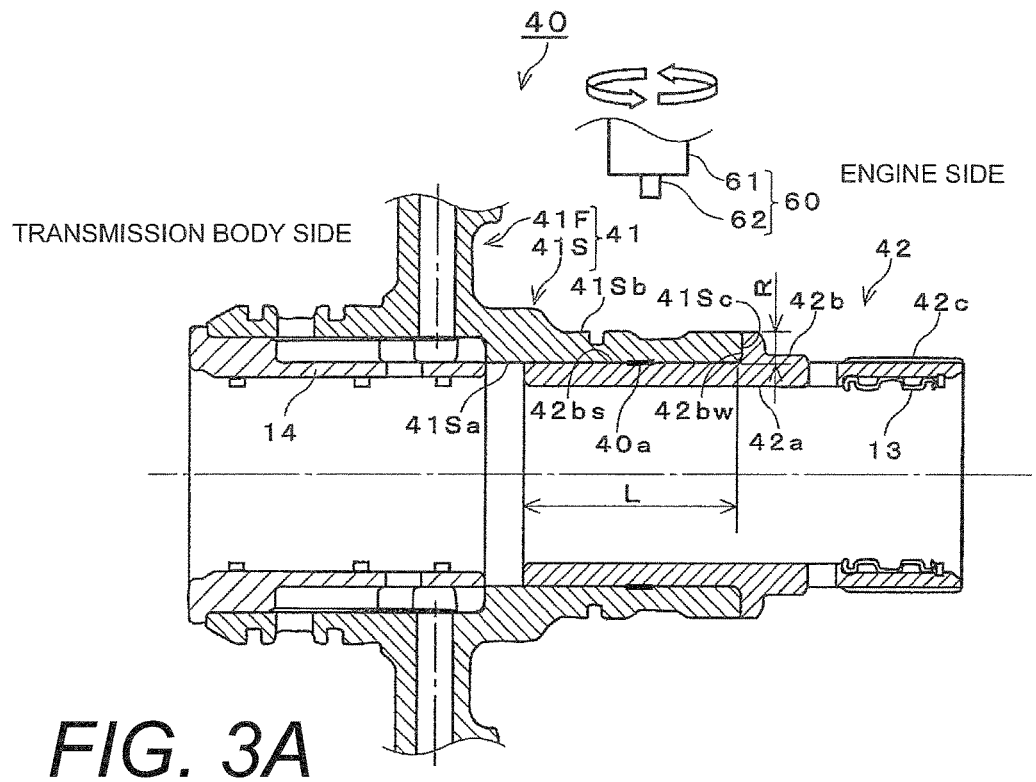
FIGS. 3A and 3B are explanatory views illustrating the stator shaft according to the first embodiment of the present invention.
Figure 3B:
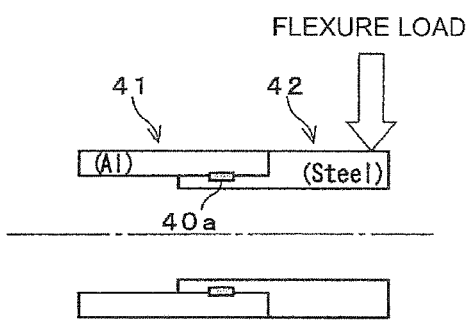

FIGS. 3A and 3B are explanatory views illustrating the stator shaft 40 according to the first embodiment of the present invention. Note here that FIG. 3A is a main-part sectional view, and FIG. 36 is an explanatory view illustrating mitigation of concentration of stress applied on a joint section 40a between the shafts upon application of a flexure load. In addition, for the convenience of explanation, the third shaft 14 and a friction stir welding tool 60 are also illustrated in FIG. 3A.

The stator shaft 40 is constituted of: the first shaft 41 that is fixed on the first partition 43 (FIG. 2) of the transmission body 3 and supports the second shaft 42; and the second shaft 42 that is joined to an inner circumferential face of the first shaft 41 by press fitting and supports the stator 24.

The first shaft 41 is a hollow shaft wholly made of light metal such as aluminum or an alloy thereof, and is constituted of a cylindrical straight portion 41S and a disc-shaped flange portion 41F. The straight portion 41S engages with the second shaft 42 and the flange portion 41F engages with the first partition 43 (FIG. 2) of the transmission body 3, whereby the stator shaft 40 is fixed unrotatably.

The second shaft 42 is a hollow shaft made of iron group metal such as stainless steel and coaxial with the first shaft 41. Meanwhile, its outer circumferential face 42b is joined, in a range of a length L in the axial direction from its tip on the transmission body 3 side, to an inner circumferential face 41Sa of the first shaft 14 by press fitting, thus forming an axial overlap section 42bs over which the second shaft overlaps the first shaft 41 in the axial direction. Further, in a range of a length R in the radial direction from the axial overlap section 42bs, the outer circumferential face 42b of the second shaft 42 is made to butt against an end face 41Sc of the first shaft 41, thus forming a radial overlap section 42bw over which the second shaft overlaps the first shaft 41 in the radial direction.

On an outer circumferential face of the second shaft 42 at a tip part thereof on the engine 1 side, spline teeth 42c are formed circumferentially and spline coupled to the intermediate member 26 (FIG. 2) on which the one-way clutch 25 (FIG. 2) is mounted. On the other hand, on an inner circumferential face of the second shaft 42 at the tip part thereof, the bearing 13 rotatably supporting the main shaft 12 (FIG. 2) is mounted.

The first shaft 41 and the second shaft 42 are joined on their faces in such a way that the axial overlap section 42bs between both shafts is joined at the joint section (joint path) 40a, extending along the circumferential direction for example, by means of the friction stir welding tool 60 including: a shoulder 61 that is a cylindrical rotor; and a pin 62 that is provided at a central part of the tip of the shoulder 61. In this respect, variations of this joint section 40a will be described later with reference to FIG. 4.

The friction stir welding tool 60 comes into contact with an outer circumferential face 41Sb of the first shaft 41 from the outside in the radial direction while rotating, softens the contact portion by way of frictional heat generated by friction between the shoulder 61 and the outer circumferential face 41Sb, and then moves radially inward to soften a part near the axial overlap section 42bs. Then, while stirring the softened portion with the pin 62 to bring this portion into a plastic flow state, the friction stir welding tool moves in the circumferential direction near the axial overlap section 42bs with its axial position held to weld the axial overlap section 42bs by friction stir welding.

As illustrated in FIG. 3B, the joint section 40a between the shafts according to the present invention is radially supported by the first shaft 41 located on the outer side thereof. Accordingly, when a flexure load is applied on the second shaft 42, concentration of stress on the joint section 40a is mitigated favorably by the first shaft 41, so that separation of the joint section 40a becomes less likely to occur.

Note that, in addition to the axial overlap section 42bs between the first shaft 41 and the second shaft 42, the radial overlap section 42bw, being a portion over which both shafts overlap each other in the radial direction, may be welded by friction stir welding along a joint path extending in the circumferential direction.

In this way, instead of existing stator shafts wholly made of iron group metal, the stator shaft 40 according to the present invention is a dissimilar metal welded shaft whose tip portion requiring strength is constituted of the second shaft 42 made of iron group metal and whose portion other than the tip portion not requiring strength is constituted of the first shaft 41 made of aluminum group light metal. Accordingly, since the stator shaft 40 is constituted of aluminum group light metal in the portion other than the tip portion, the weight of the entire shaft can be significantly reduced.

Meanwhile, the first shaft 41 and the second shaft 42 are joined together by joining the second shaft 42 to the inner circumferential face of the first shaft 41 by press fitting and then joining these shafts on their faces along the circumferential direction using the friction stir welding tool 60.

Further, when a flexure load is applied on the second shaft 42, concentration of stress on the joint section 40a is mitigated favorably because the joint section 40a is radially supported by the first shaft 41. Thereby, separation of the joint section 40a becomes less likely to occur and their joint strength is increased.

Alternatively, the second shaft 42 may be configured such that only the outer circumferential face 42b is constituted of iron group metal and the portion other than the outer circumferential face 42b is constituted of non-ferrous metal (such as aluminum group metal) or nonmetal (resin material).

FIGS. 4A to 4E are explanatory views illustrating variations of the joint section (joint path) made by friction stir welding according to the first embodiment of the present invention. Note that directions (left and right) in the axial direction and the circumferential direction throughout the following description indicate directions based on the shaft posture illustrated in FIGS. 4A to 4E.

Figure 4A:
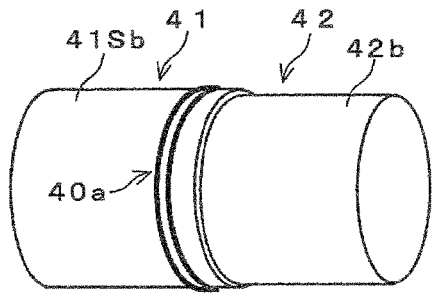
FIGS. 4A to 4E are explanatory views illustrating variations of a joint section (joint path) made by friction stir welding according to the first embodiment of the present invention.

First, the joint section 40a illustrated in FIG. 4A is made by joining the first shaft 41 and the second shaft 42 by friction stir welding in such a way that, from the outer side in the radial direction of the outer circumferential face 41Sb of the first shaft 41, the friction stir welding tool 60 (FIG. 3) is driven to move linearly on the axial overlap section 42bs (FIG. 3) between the first shaft 41 and the second shaft 42 continuously along the circumferential direction. Note that the word "linearly" stated herein denotes that the joint path is linear in a development view in which the joint path is developed on a flat plane.

Since the friction stir welding tool 60 has only to be driven to move linearly continuously in the circumferential direction while being fixed axially, this joint section 40a is the best joint section in terms of production efficiency.

Figure 4B:
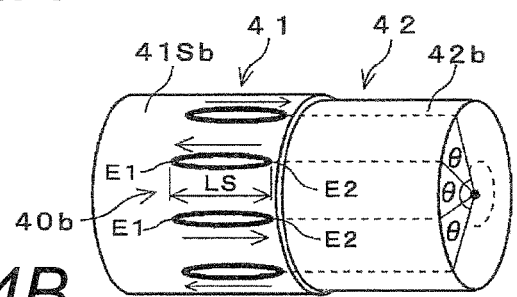
Figure 4C:
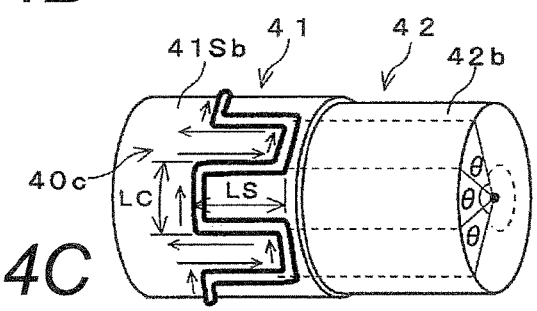

Next, a joint section 40b illustrated in FIG. 4B is made by joining the first shaft 41 and the second shaft 42 by friction stir welding in such a way that, for every predetermined circumferential angle θ (at equal intervals), the friction stir welding tool 60 is driven to move linearly on the axial overlap section 42bs between the first shaft 41 and the second shaft 42 continuously by a predetermined length LS in the axial direction. In this respect, an endpoint located on the same side as the destination point of, for example, the last axial driving of the friction stir welding tool 60 had better be set as the starting point of the next axial driving in order that the joint section 40b may be formed with the minimum driving distance. For example, after the friction stir welding tool 60 is driven to move right in the axial direction from an endpoint E1 to an endpoint E2, the starting point of the next axial driving is the endpoint E2.

This joint section 40b makes it possible to increase the joint area by increasing the number of joints (circumferential angle θ and the axial length LS, and thereby increase the joint strength. In addition, since the joint section 40a is continuous in the circumferential direction, partial separation might induce the entire separation; on the other hand, since the joints of the joint section 40b are independent of one another, partial separation will not induce the entire separation.

Further, since the joint section 40b makes it possible to secure a large joint area in the axial direction, the rigidity of the joint section 40b against a flexure load can be kept favorably.

Note that these joints may be arranged unevenly in the circumferential direction, and the axial length LS may be changed for every circumferential angle θ. Besides, each joint may have not only a linear shape but also a curve shape.

Next, a joint section 40c illustrated in FIG. 40 is made by joining the first shaft 41 and the second shaft 42 by friction stir welding in such a way that the friction stir welding tool 60 is driven to move linearly on the axial overlap section 42bs between the first shaft 41 and the second shaft 42 by a predetermined axial length LS and then by a predetermined circumferential length LC continuously while flipping only its axial driving direction (i.e., to the left or to the right) for every predetermined circumferential angle θ. For example, the first shaft 41 and the second shaft 42 are joined by friction stir welding in such a way that the friction stir welding tool 60 is driven to move linearly continuously like: by the length LC to the right in the circumferential direction; then by the length LS to the right in the axial direction; then by the length LC to the right in the circumferential direction; then by the length LS to the left in the axial direction; then by the length LC to the right in the circumferential direction; then by the length LS to the right in the axial direction; then by the length LC to the right in the circumferential direction; then by the length LS to the left in the axial direction; then by the length LC to the right in the circumferential direction; and then in the same manner thereafter. In this respect, in order to make the starting point and destination point of the joint section 40c coincide with each other, the circumferential length LC is determined so that, for example, a value obtained by dividing the overall length of the outer circumference of the first shaft 41 by LC may be an even number.

This joint section 40c is a complex type being a combination of the joint section 40a (circumferential direction) and joint section 40b (axial direction) described above, and is superb in terms of production efficiency and joint area.

Note that the axial length LS and the circumferential length LC do not necessarily have to be constant values. Besides, the joint section may have not only a linear shape but also a curve shape.

Figure 4D:
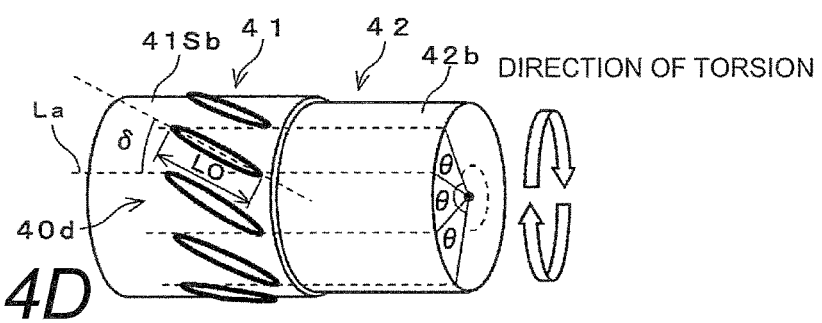

Next, a joint section 40d illustrated in FIG. 4(d) is made by joining the first shaft 41 and the second shaft 42 by friction stir welding in such a way that, for every predetermined circumferential angle θ, the friction stir welding tool 60 is driven to move linearly on the axial overlap section 42bs between the first shaft 41 and the second shaft 42 by a length LO at an angle of inclination δ to a line La parallel with the axial direction.

Figure 5:
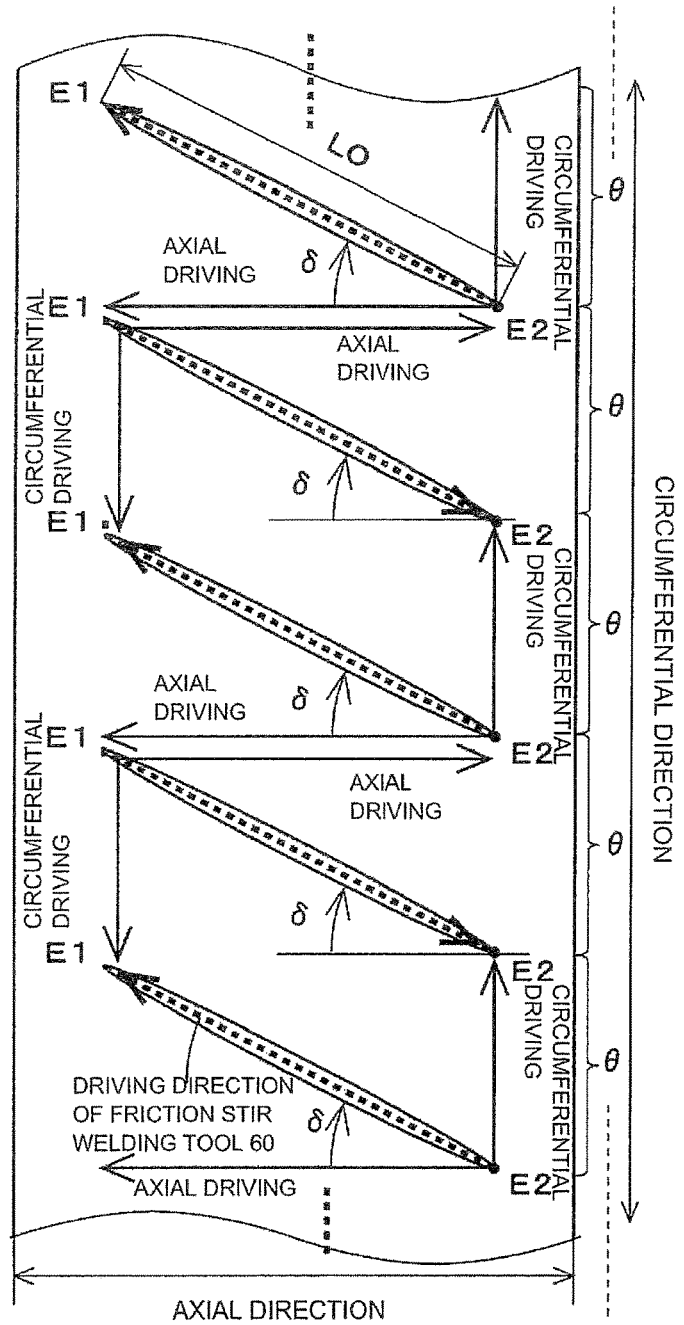
FIG. 5 is a development view in which an outer circumferential face of a first shaft in FIG. 4D is developed on a flat plane.

FIG. 5 is a development view in which the outer circumferential face Sb of the first shaft 41 in FIG. 4D is developed on a flat plane. Here, the thick dotted line indicates the direction of the driving of the friction stir welding tool 60 on the axial overlap section 42bs for every circumferential angle θ.

As apparent from FIG. 5, the driving of the friction stir welding tool 60 is obtained by combining the axial driving and circumferential driving of the friction stir welding tool 60 at the same time. In addition, in the driving of the friction stir welding tool 60 illustrated in FIG. 5, the starting point of the driving is an endpoint located on the same side as the destination point of the last driving. In this case, it can be seen that both driving directions, i.e., the axial driving direction and circumferential driving direction are flipped for every predetermined circumferential angle θ.

Figure 6A:
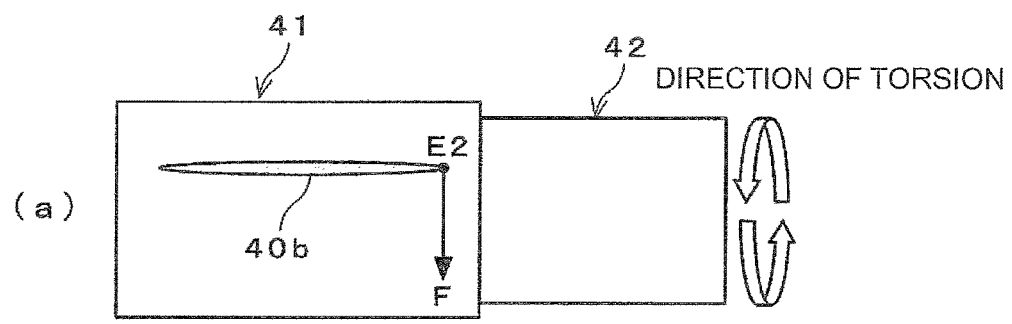
FIGS. 6A and 6B are explanatory views illustrating a relation between an inclination direction of a joint section with respect to an axial direction and mitigation of concentration of load on an end portion.

In the meantime, in the case where the joint section is formed along the axial direction (e.g., the above joint section 40b) as illustrated in FIG. 6A, once a torsional moment is applied, a load F on an end part E2 on the second shaft 42 side is concentrated in a direction orthogonal to the joining direction. On the other hand, in the case where the joint section is formed to incline with respect to the axial direction (e.g., the above joint section 40d) as illustrated in FIG. 6B, a load F concentrated on an end part is decomposed into a joining direction component F1 and a perpendicular direction component F2 perpendicular to the joining direction component, so that the load F concentrated on the end part can be dispersed favorably.

Figure 6B:
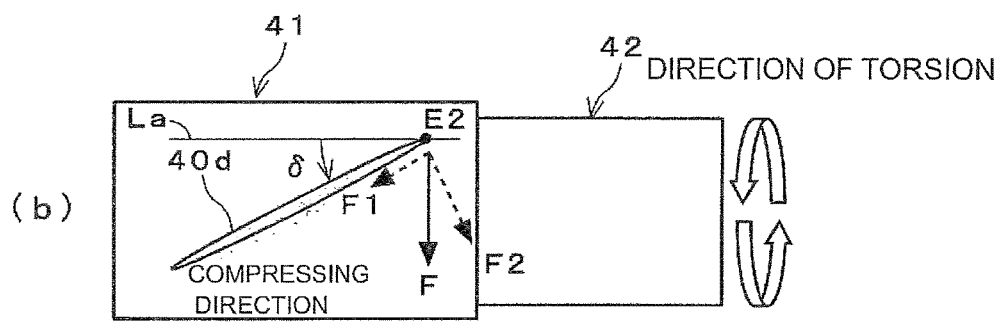

In this respect, in the case of FIG. 6B, if the inclination direction of the joint section is the same as the direction of torsion, that is, if the inclination direction of the joint section with respect to the line La as a reference, which passes through an end part E2 on the second shaft 42 side and is parallel with the axial direction, is the same as the direction of torsion, the joining direction component F1 of the load F acts on the joint section 40d in the compressing direction. In other words, the joining direction component F1 acts in the direction in which the second shaft 42 is joined to the inner circumferential face of the first shaft 41 by press fitting, so that separation of the joint section 40d becomes less likely to occur.

Turning back to FIG. 4D again, the joint section 40d is effective in improvement of joint strength only when its inclination direction with respect to the line La as a reference, which passes through the end part E2 on the second shaft 42 side and is parallel with the axial direction, is the same as the direction of torsion, that is, only in the case of so-called pulsating load.

Note that these joints do not necessarily have to be arranged evenly on the circumference, and the angle of inclination δ and the length LO do not necessarily have to be constant values. Besides, each joint may have not only a linear shape but also a curve shape.

Figure 4E:
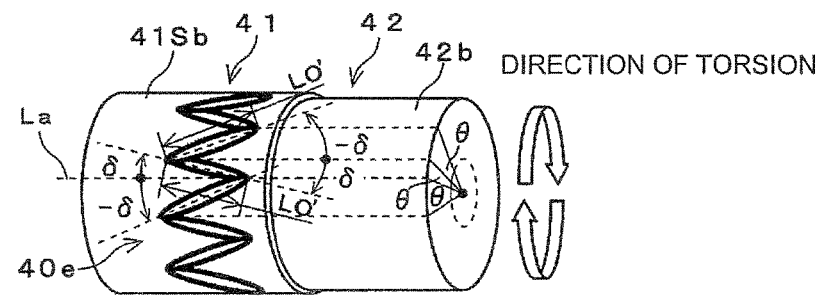

Next, a joint section 40e illustrated in FIG. 4E is made by joining the first shaft 41 and the second shaft 42 by friction stir welding in such a way that, for example, the friction stir welding tool is driven to move linearly on the axial overlap section 42bs between the first shaft 41 and the second shaft 42 by a length LO' to the left in the axial direction at an angle of inclination δ to the right in the circumferential direction with respect to the line La parallel with the axial direction, is then driven to move linearly by the length LO' to the right in the axial direction at an angle of inclination −δ to the left in the circumferential direction, which is symmetric to the foregoing angle of inclination δ about the line La, and then the driving in the above manner is repeated thereafter. In this respect, as in the case of the joint section 40c, in order to make the starting point and destination point of the joint section 40e coincide with each other, the circumferential angle θ is determined so that, for example, a value obtained by dividing 360° by θ may be an even number.

Figure 7:
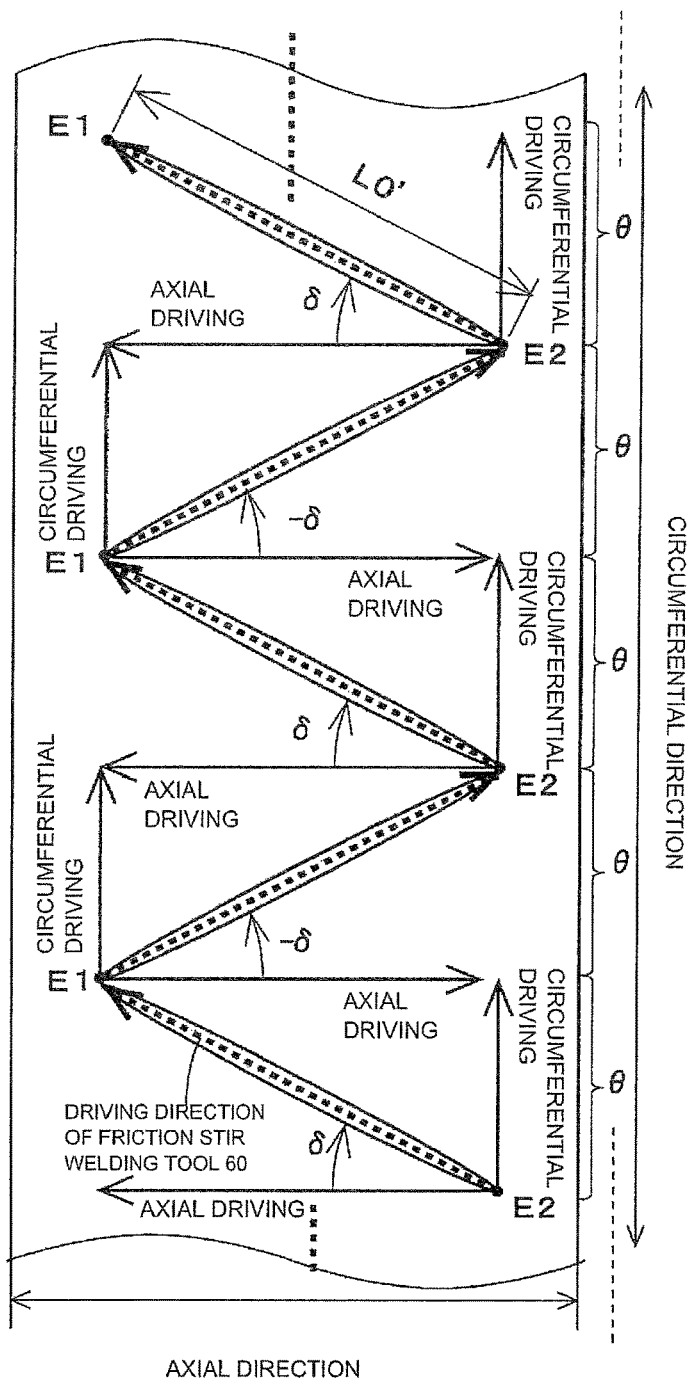
FIG. 7 is a development view in which an outer circumferential face of a first shaft in FIG. 4E is developed on a flat plane.

FIG. 7 is a development view in which the outer circumferential face 41Sb of the first shaft 41 in FIG. 4E is developed on a flat plane. Here, the thick dotted line indicates the direction of the driving of the friction stir welding tool 60 on the axial overlap section 42bs for every circumferential angle θ.

As apparent from FIG. 7, the driving of the friction stir welding tool 60 is obtained by combining the axial driving and circumferential driving of the friction stir welding tool 60 at the same time. In addition, in the driving of the friction stir welding tool 60 illustrated in FIG. 7, the starting point of the driving is the same endpoint as the destination point of the last driving. In this case, it can be seen that only the axial driving direction is flipped for every predetermined circumferential angle θ and the circumferential driving direction is a constant direction.

Turning back to FIG. 4E again, since the joint section 40e is constituted of two kinds of joints, i.e., one with the inclination direction the same as the direction of torsion and the other with the inclination direction opposite the direction of torsion, this joint section is effective in improvement of joint strength irrespective of the direction of torsion, that is, not only in the case of pulsating load but also in the case of so-called alternating load. In this case, since the joint area in the axial direction is large, this form of joint is tight even against a flexure load. Accordingly, this joint section 40e has the strongest joint strength of all the above joint sections including the joint sections 40a, 40b, 40c, and 40d.

Note that the angle of inclination δ and the length LO' do not necessarily have to be constant values. Moreover, each joint may have not only a linear shape but also a curve shape. Further, the absolute values of the respective angle of inclination δ and angle of inclination −δ may differ from each other, like 10° and −15°. In other words, the angle of inclination may be flipped asymmetrically about the line La.

Here, in the foregoing description about the variations of the joint section, the friction stir welding tool 60 (hereinafter simply referred to as "tool") is driven in the predetermined direction while the first shaft 41 and the second shaft 42 (hereinafter simply referred to as "workpieces") subjected to friction stir welding are fixed.

It is also possible to achieve the predetermined joint section by, in contrast to the above method, driving the workpieces in a predetermined direction with the tool fixed. For example, by driving the workpieces to rotate by 360° or to move axially by a distance LS with the tool fixed, it is also possible to achieve the above joint section 40a or 40b illustrated in FIG. 4A or 4B at which the workpieces are joined along the circumferential direction or the axial direction by friction stir welding. Note here that the expression "with the tool fixed" stated herein denotes a state where the tool is incapable of displacement in the axial direction and rotation direction (circumferential direction) of the workpieces. Accordingly, the tool is capable of displacement in the radial direction of the workpieces. In this respect, the "rotational driving" stated herein denotes rotating the workpieces about the axis thereof, and the "axial driving" denotes moving the workpieces linearly in parallel with the axis thereof.

Alternatively, it is also possible to achieve the predetermined joint section by driving both the workpieces and the tool sequentially in the respective predetermined directions instead of the method of driving any one of the workpieces and the tool. For example, by driving the tool axially by the distance LS and then driving the workpieces rotationally by the predetermined angle θ (arc length LC), it is also possible to achieve the joint section 40c illustrated in FIG. 4C at which the workpieces are joined by friction stir welding along a complex direction being a combination of the axial direction and the circumferential direction.

Still alternatively, by driving the tool axially by a predetermined distance (LO×cos δ) and at the same time driving the workpieces rotationally by the predetermined angle θ (arc length LO×sin δ), it is also possible to achieve the joint section 40d illustrated in FIG. 4D at which the workpieces are joined by friction stir welding along an inclination direction inclined by the predetermined angle δ with respect to the axial direction.

Still alternatively, by driving the tool axially by a predetermined distance (LO'×cos δ) while flipping its axial driving direction for every predetermined circumferential angle θ and at the same time driving the workpieces rotationally by the predetermined angle θ (arc length LO'×sin δ), it is also possible to achieve the joint section 40e illustrated in FIG. 4E at which the workpieces are joined by friction stir welding along an inclination direction inclined alternately by the predetermined angles δ and −δ with respect to the axial direction.

Figure 8:
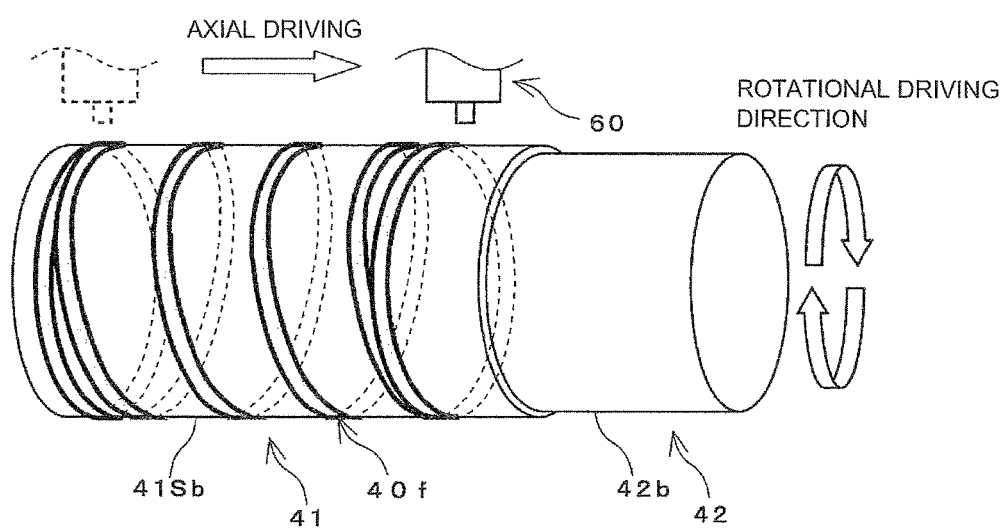
FIG. 8 is an explanatory view illustrating a variation of a joint section (joint path) made by friction stir welding according to the first embodiment of the present invention.

Still alternatively, by driving the workpieces rotationally by a predetermined number of revolutions (5.5 times in this embodiment) and at the same time driving the tool axially, for example, it is also possible to achieve a joint section 40f illustrated in FIG. 8 at which the workpieces are joined by friction stir welding along a helical direction.

Second Embodiment

In the meantime, in the case of joining the axial overlap section 42bs between the first shat 41 and the second shaft 42 by friction stir welding using the friction stir welding tool 60, a so-called tool pullout hole is generated in the outer circumferential face 41Sb of the first shaft 41 at the time of pulling out the friction stir welding tool 60 therefrom. Thus, by using this tool pullout hole as a part of the oil path (prepared hole), it is possible to provide an oil path passing through the axial overlap section 42bs between the first shaft 41 and the second shaft 42. In this case, since the second shaft 42 is joined to the inner circumferential face 41Sa of the first shaft 41 by press fitting, the freedom in the layout of the oil path is increased. Hereinbelow, a description is given of a stator shaft having an oil path formed therein.

Figure 9A:
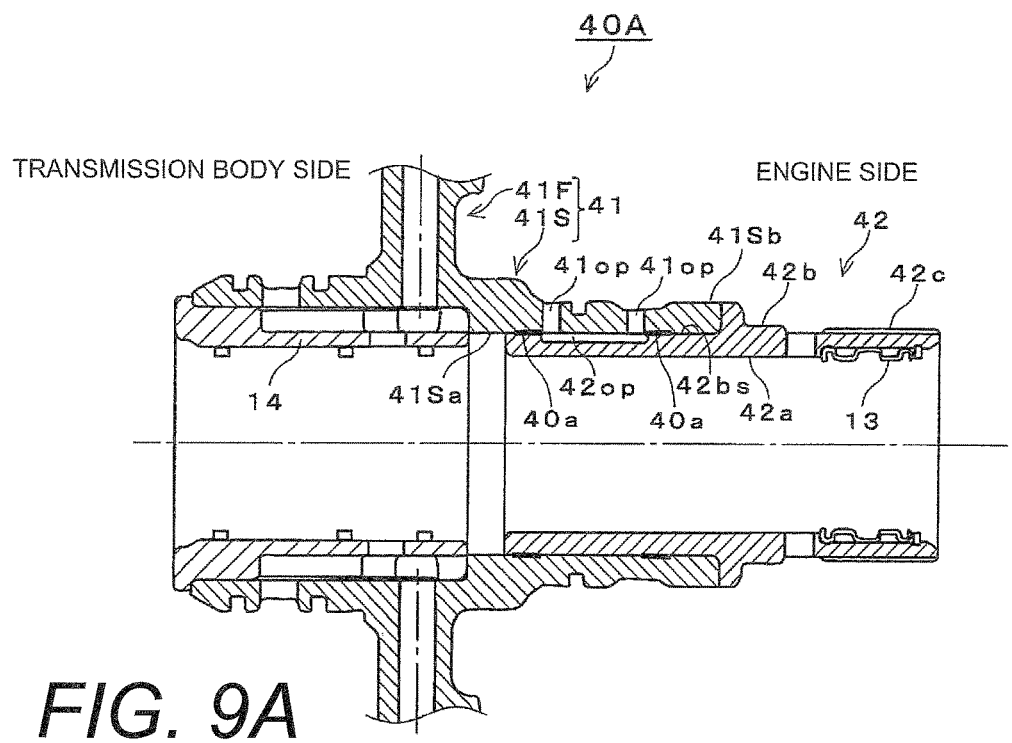
FIGS. 9A and 9B are explanatory views illustrating a stator shaft according to a second embodiment of the present invention.
Figure 9B:
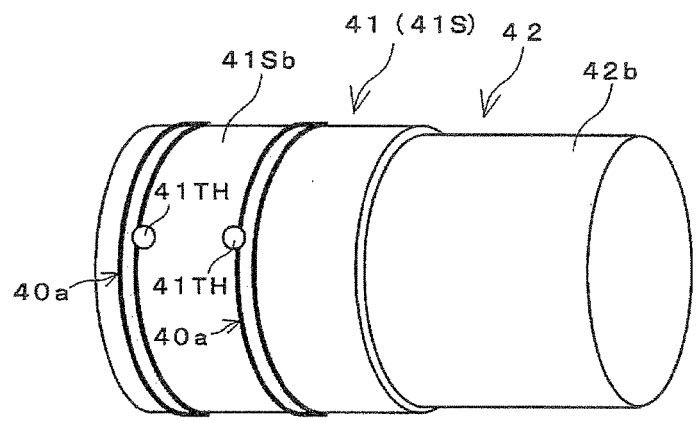

FIGS. 9A and 9B are explanatory views illustrating a stator shaft 40A according to a second embodiment of the present invention. In this respect, FIG. 9A is a main-part sectional view of the stator shaft 40A, and FIG. 9B is a simplified diagram of the stator shaft 40A immediately after the friction stir welding of the axial overlap section 42bs.

As illustrated in FIG. 9A, in the stator shaft 40A, two oil paths 41op, 41op are formed in the straight portion 41S of the first shaft 41, whereas an oil path 42op communicating with the above oil paths 41op, 41op is formed in the axial overlap section 42bs of the second shaft 42. In addition, parts of the axial overlap section 42bs on both sides of the oil path 42op are each subjected to friction stir welding along the circumferential joint path illustrated in FIG. 4A in the above first embodiment, whereby joint sections 40a, 40a having the same configuration as the joint section illustrated in FIG. 4A are formed. Note that, except for the above, the configuration of this stator shaft is the same as the configuration of the stator shaft 40 according to the first embodiment.

The oil path 42*op* of the second shaft 42 is formed in the axial overlap section 42*bs* in advance and, on the other hand, the two oil paths 41*op*, 41*op* of the first shaft 41 are formed after the friction stir welding of the axial overlap section 42*bs*. Specifically, as illustrated in FIG. 9B, when the axial overlap section 42*bs* of the second shaft 42 is subjected to friction stir welding along the circumferential direction, tool pullout holes 41TH are generated in the outer circumferential face 41Sb of the first shaft 41 at the time of pulling out the friction stir welding tool 60. With these tool pullout holes 41TH used as prepared holes for the oil paths, the tool pullout holes 41TH are made to communicate with the oil path 42*op* previously formed in the axial overlap section 42*bs*, whereby the oil paths 41*op* are formed. As a result, these oil paths 41*op*, 41*op* and the oil path 42*op* can be used, for example, as oil paths for lubricating the sprocket 45 (FIG. 2) to drive the oil pump OP, the bearing 46 (FIG. 2) to rotatably support the sprocket 45, and the like. In this respect, since the joint sections 40*a* made by the friction stir welding are formed on both sides of a set of the oil paths 41*op*, 41*op* and the oil path 42*op* so as to axially sandwich the oil paths 41*op*, 41*op* and the oil path 42*op*, these joint sections 40*a*, 40*a* function to seal the oil paths 41*op*, 41*op* and the oil path 42*op*.

Here, the above tool pullout holes 41TH are formed in a portion away from (portion distant from) a portion subjected to a rotational load from the stator 24 (FIG. 2) (the tip portion 42*c* of the second shaft 42). This is because, if the tool pullout holes 41TH are formed in a portion near the tip portion 42*c* of the second shaft 42, stresses will be concentrated on the tool pullout holes 41TH and this concentration of stress might induce separation of the joint section 40*a* right near these holes. Accordingly, it is preferable that the tool pullout holes 41TH be formed in the portion away from (portion distant from) the tip portion 42*c* of the second shaft 42.

Third Embodiment

Figure 10:
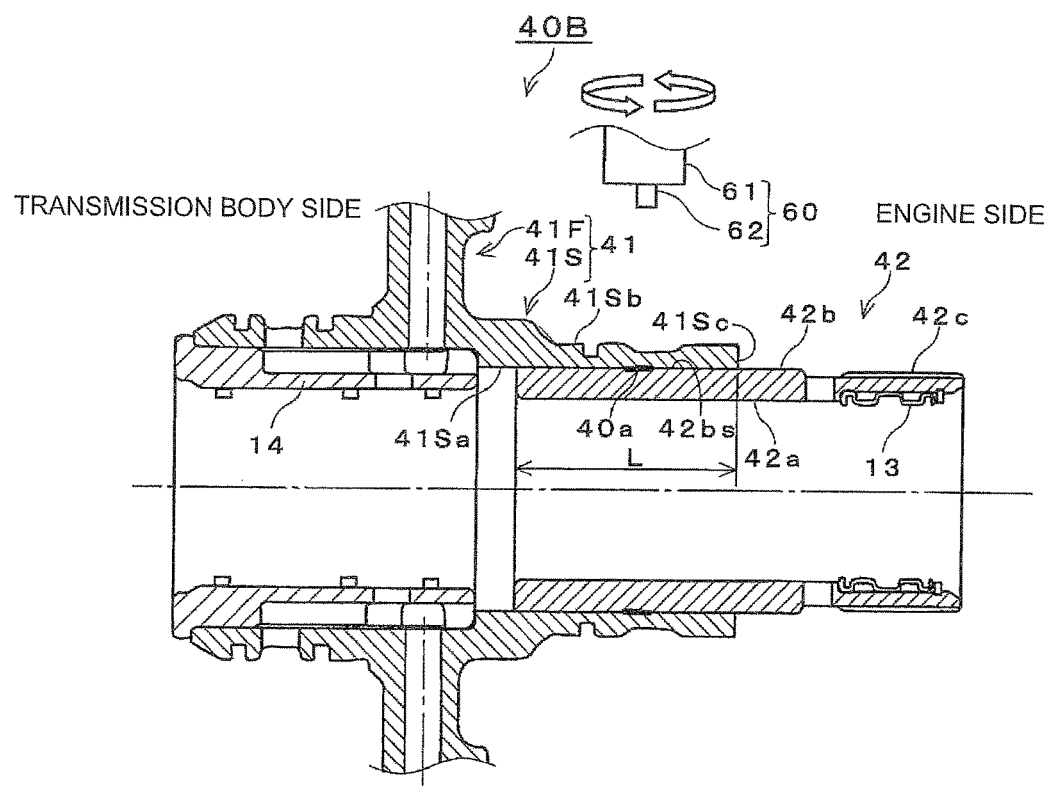
FIG. 10 is a main-part sectional view illustrating a stator shaft according to a third embodiment of the present invention.

FIG. 10 is a main-part sectional view illustrating a stator shaft 40B according to a third embodiment of the present invention.

In this stator shaft 40B, unlike the above stator shaft 40, the engine 1—side end face 41Sc of the first shaft 41 in the axial direction is not joined to the outer circumferential face 42*b* of the second shaft 42. In other words, the first shaft 41 and the second shaft 42 are joined on their faces only at the axial overlap section 42*bs*. By omitting the radial overlap section 42*bw* (FIG. 3), the structure of the second shaft 42 is simplified, thereby making it possible to contribute to a reduction in manufacturing cost.

As has been described above, the following effects can be achieved by employing friction stir welding for the axial overlap section between the first shaft 41 and the second shaft 42.

(1) In friction welding, flash needs to be removed from a joint section. On the other hand, in friction stir welding, since a rotary tool is used to expose a newly-formed face of steel, flash to be generated is so fine that no removal is required. This enables a reduction in manufacturing cost.

(2) In friction welding, since both members to be joined are pushed against each other in the axial direction, the axial dimensional accuracy is unstable. On the other hand, in friction stir welding, since only a radial load from the tool acts on both members to be joined, the axial dimensional accuracy is stable. Thus, an object whose members to be joined have been joined together by friction stir welding can be used as a product as is.

(3) In the case where members to be joined have phases such as hydraulic holes, precise rotation stop control is needed in friction welding. On the other hand, in friction stir welding, the second shaft 42 can be joined to the first shaft 41 by press fitting after their phases are aligned. Accordingly, precise rotation stop control is no longer needed and thus product quality is stabilized.

(4) If the first shaft 41 and the second shaft 42 are joined by friction welding while butting against each other in the axial direction as in the existing techniques, stresses are concentrated on a joint section between these shafts when a flexure load is applied on their axes. On the other hand, if the first shaft 41 and the second shaft 42 are joined by friction stir welding while the second shaft is joined to the inner circumferential face of the first shaft by press fitting as in the present application, the first shaft 41 located on the outer side serves to support the joint section 40*a*, thereby easing concentration of stress on the joint section and providing a tight joint against a flexure load.

(5) In the case of friction welding, a heat affected zone on steel side is widespread from a joint section. On the other hand, in the case of friction stir welding, heat is applied within a range of the diameter of the tool, and cooling action caused by plastic flow of aluminum (first shaft 41) is also applied thereon. Accordingly, even heat-treated components no longer happen to be tempered, thus expanding the range of members to be joined which can be employed.

(6) By joining the overlap section between the first shaft 41 and the second shaft 42 on their faces at two or more locations by friction stir welding, the oil path can be provided between the first shaft 41 and the second shaft 42. In this case, the joint sections function to seal the oil path. Further, since the second shaft 42 is joined to the inner circumferential face of the first shaft 41 by press fitting, the freedom in the layout of the oil path is increased.

A transmission according to the present invention for achieving the above objective is a transmission (100) including a dissimilar metal joined shaft (40) in which at least a first shaft (41) and a second shaft (42) made of dissimilar materials are joined coaxially, characterized in that the first shaft (41) has a hollow structure and the second shaft (42) is press fitted into the first shaft (41), an inner circumferential face (41Sa) of the first shaft (41) and an outer circumferential face (42*b*) of the second shaft (42) have an axial overlap section (42*bs*) where the first and second shafts overlap each other in an axial direction, and the axial overlap section is joined by friction stir welding.

In the above configuration, the first shaft (41) is disposed radially outside the shaft joint section between the first shaft (41) and the second shaft (42), and the shaft joint section is supported radially by the first shaft (41). Accordingly, concentration of load (stress) on the shaft joint section is mitigated favorably and thus separation of the shaft joint section becomes less likely to occur even when a flexure load and a torsional load (rotational torque) are applied on the axis, whereby the joint strength is increased.

In addition, since the first shaft (41) and the second shaft (42) are joined by friction stir welding while they are at rest, flash removal processing and precise positioning control, which would otherwise be required in friction welding, are no longer needed, and the problem specific to friction welding, such as instability of the axial dimensional accuracy (tolerance) of the shaft or oxide layers and contaminants remaining on the joint interface, will not occur.

A second aspect of the transmission according to the present invention is characterized in that the first shaft (41) is constituted of light metal, and the outer circumferential face (42b) of the second shaft (42) is constituted of metal stronger and having a higher fusing point than the light metal.

In the above configuration, the second shaft (42) having a relatively high fusing point is press fitted into the first shaft (41) having a relatively low fusing point. This makes it possible to bring the friction stir welding tool (60) into contact with the outer circumferential face (41Sb) of the first shaft (41) from radially outside the first shaft (41), and thus possible to subject the axial overlap section between the first shaft (41) and the second shaft (42) to friction stir welding along a desired joint path (40a, 40b, 40c, 40d, 40e).

In addition, it is possible to arrange the relatively strong second shaft (42) as an axis requiring high strength and arrange the lightweight first shaft (41) as an axis not requiring high strength, so that the weight of the entire shaft can be significantly reduced.

A third aspect of the transmission according to the present invention is characterized in that the axial overlap section (42bs) is joined by friction stir welding in such a way as to be: continuously by a predetermined length (LC, LS, LO) for every predetermined interval (θ) in a circumferential direction along any one of the circumferential direction (40a), the axial direction (40b), an inclination direction inclined by a predetermined angle (δ) with respect to the axial direction (40d), and a helical direction (40f), or; continuously along a complex direction made by a combination of these directions (40c).

In the above configuration, the freedom in the length and the area of the joint path in the joining of the first shaft (41) and the second shaft (42) is increased. Thereby, it is possible to select a joint path with optimum joint strength according to the magnitude and the direction of loads to be applied on the dissimilar metal joined shaft (40).

A fourth aspect of the transmission according to the present invention is characterized in that the axial overlap section (42bs) is joined by friction stir welding along an inclination direction (40e) where an angle of inclination (δ, −δ) to the axial direction is flipped alternately for every predetermined interval (θ) in a circumferential direction.

In the above configuration, an inclination direction of a joint section (40e) with respect to a line (La) passing through an end part (E2) of the joint section (40e) on the second shaft (42) side and being parallel with the axial direction contains two kinds of inclination directions (±δ) inclined in both directions with respect to the line (La) (alternating load). In other words, irrespective of whether a torsional load acts clockwise or counterclockwise, the above configuration surely contains the inclination direction being the same as the direction of torsion. When the inclination direction of the joint section is the same as the direction of torsion, a compressive load acts on the joint section, which makes separation of the joint section less likely to occur. That means the above configuration makes separation of the joint section between both shafts less likely to occur regardless of in which direction a torsional load acts, so that the joint strength is further increased.

A fifth aspect of the transmission according to the present invention is characterized in that a joint section made according to the inclination direction (40d) is inclined in the same direction as a direction of a torsional load, which acts on the second shaft (42), with respect to a line (La) passing through an end part (E2) of the joint section on the second shaft (42) side and being parallel with the axial direction.

In the above configuration, a load to be applied on the joint section is divided into a joining direction load and a perpendicular direction load perpendicular to the joining direction load. In particular, by setting the above inclination direction equal to the above rotation direction, a load to act in the joining direction becomes a compressive load, so that separation of the shaft joint section between the first shaft (41) and the second shaft (42) becomes less likely to occur and the joint strength is further increased.

A sixth aspect of the transmission according to the present invention is characterized in that the transmission (100) includes a torque converter (2), the torque converter (2) has a stator (24) supported by the second shaft (42), and the first shaft (41) is fixed on a fixation member (43) of the transmission (100).

In the above configuration, the second shaft (42) made of a material with superior strength and rigidity to the first shaft (41) is arranged as an axis which receives a load from the stator (24), whereas the first shaft (41) is arranged in a part which receives a relatively small load. Thereby, it is possible to reduce the weight of the entire shaft significantly while maintaining required strength and rigidity.

Effect of the Invention

According to the transmission including the dissimilar metal joined shaft of the present invention, flash removal processing and precise positioning control on the dissimilar metal joined shaft at the time of manufacturing are no longer needed. Moreover, the axial dimensional accuracy (tolerance) of the shaft is no longer unstable and contaminants such as oxide layers no longer remain on the joint interface. Further, concentration of stress on the shaft joint section is mitigated favorably and thus separation of the shaft joint section becomes less likely to occur even when a flexure load, a torsional load, and the like are applied thereon while the transmission is in operation, whereby the joint strength is increased.

Besides, it is possible to arrange shafts with optimum strength according to loads to be applied thereto, and thus possible to reduce the weight of the entire shaft significantly while maintaining required strength and rigidity.

Obviously, numerous modifications and variations of the present invention are possible in light of the above teachings. It is therefore to be understood that within the scope of the appended claims, the invention may be practiced otherwise than as specifically described herein.

What is claimed is:

1. A transmission comprising a dissimilar metal joined shaft in which at least a first shaft and a second shaft made of dissimilar materials are joined coaxially, the transmission including a stator supported by said second shaft, the second shaft being non-rotatably fixed within the transmission, wherein said first shaft has a hollow structure and said second shaft is press fitted into said first shaft, an inner circumferential face of said first shaft and an outer circumferential face of said second shaft have an axial overlap section where said first and second shafts overlap each other in an axial direction, said axial overlap section is joined by friction stir welding, said axial overlap section is a press fitted portion, and said axial overlap section is joined by friction stir welding in the press fitted portion.

2. The transmission comprising the dissimilar metal joined shaft according to claim 1, wherein said first shaft is constituted of light metal, and the outer circumferential face of said second shaft is constituted of metal stronger and having a higher fusing point than said light metal.

3. The transmission comprising the dissimilar metal joined shaft according to claim 1, wherein said axial overlap section is joined by friction stir welding in such a way as to be: continuous over a predetermined length for every predetermined interval in a circumferential direction along any one of the circumferential direction, the axial direction, an inclination direction inclined by a predetermined angle with respect to the axial direction, and a helical direction, or; continuously along a complex direction made by a combination of said directions.

4. The transmission comprising the dissimilar metal joined shaft according to claim 1, wherein said axial overlap section is joined by friction stir welding along an inclination direction where an angle of inclination to the axial direction is flipped alternately for every predetermined interval in a circumferential direction.

5. The transmission comprising the dissimilar metal joined shaft according to claim 1, wherein
said axial overlap section is joined by friction stir welding in such a way as to be continuous over a predetermined length for every predetermined interval in a circumferential direction along an inclination direction, and
a joint section made according to said inclination direction is inclined in the same direction as a direction of a torsional load, which acts on said second shaft, with respect to a line passing through an end part of said joint section on said second shaft side and being parallel with the axial direction.

6. The transmission comprising the dissimilar metal joined shaft according to claim 1, wherein
said transmission includes a torque converter,
said torque converter includes the stator supported by said second shaft, and
said first shaft is fixed on a fixation member of said transmission.

7. The transmission comprising the dissimilar metal joined shaft according to claim 1, wherein the overlap section is joined by the friction stir welding such that the overlap section includes a friction stir welded joint section spaced from the stator in the axial direction.

8. The transmission comprising the dissimilar metal joined shaft according to claim 1, wherein the transmission further comprises a main shaft rotatably supported by the dissimilar metal joined shaft.

9. A transmission comprising:
a first shaft made of a first metal material and having a hollow structure;
a second shaft made of a second metal material different from the first metal material and fitted into the hollow structure of the first shaft at an axial overlap section, the first shaft and the second shaft being coaxially connected at the axial overlap section with friction stir welding, the second shaft being non-rotatably fixed within the transmission, the axial overlap section being a press fitted portion, the axial overlap section being formed by friction stir welding in the press fitted portion; and
a stator supported by the second shaft.

10. The transmission according to claim 9, wherein
the first shaft has an inner circumferential face,
the second shaft has an outer circumferential face, and
the inner circumferential face of the first shaft is connected with the outer circumferential face of the second shaft at the axial overlap section such that the second shaft is coaxially arranged with the first shaft.

11. The transmission according to claim 10, wherein
the first shaft is made of light metal, and
the outer circumferential face of the second shaft is made of metal stronger and having a higher fusing point than the light metal.

12. The transmission according to claim 11, wherein the light metal includes aluminum.

13. The transmission according to claim 9, wherein
the second shaft is press fitted into the hollow structure of the first shaft at the axial overlap section.

14. The transmission according to claim 9, wherein
the axial overlap section is joined by friction stir welding in such a way as to be: continuous over a predetermined length for every predetermined interval in a circumferential direction along any one of the circumferential direction, an axial direction, an inclination direction inclined by a predetermined angle with respect to the axial direction, and a helical direction, or; continuously along a complex direction made by a combination of the directions.

15. The transmission according to claim 14, wherein a joint section made according to the inclination direction is inclined in the same direction as a direction of a torsional load, which acts on the second shaft, with respect to a line passing through an end part of the joint section on the second shaft side and being parallel with the axial direction.

16. The transmission according to claim 9, wherein the axial overlap section is joined by friction stir welding along an inclination direction where an angle of inclination to an axial direction is flipped alternately for every predetermined interval in a circumferential direction.

17. The transmission according to claim 9, further comprising a torque converter, wherein
the torque converter includes the stator supported by the second shaft, and
the first shaft is fixed on a fixation member of the transmission.

18. The transmission according to claim 9, wherein
the overlap section is joined by the friction stir welding such that the overlap section includes a friction stir welded joint section spaced from the stator in the axial direction.

19. The transmission according to claim 9, further comprising
a main shaft rotatably supported by the first shaft and the second shaft.

* * * * *